(12) United States Patent
Elangovan et al.

(10) Patent No.: US 12,574,347 B2
(45) Date of Patent: Mar. 10, 2026

(54) VEHICLE NETWORK ADDRESS ASSIGNMENT

(71) Applicant: Ford Global Technologies, LLC, Dearborn, MI (US)

(72) Inventors: Vivekanandh Elangovan, Canton, MI (US); Timothy Thivierge, Jr., Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 948 days.

(21) Appl. No.: 17/325,340

(22) Filed: May 20, 2021

(65) Prior Publication Data

US 2022/0377051 A1 Nov. 24, 2022

(51) Int. Cl.
| | |
|---|---|
| *H04L 61/50* | (2022.01) |
| *H04L 61/5038* | (2022.01) |
| *H04L 61/5092* | (2022.01) |
| *H04W 4/02* | (2018.01) |
| *H04W 4/40* | (2018.01) |
| *H04W 4/48* | (2018.01) |
| *H04L 101/627* | (2022.01) |
| *H04L 101/69* | (2022.01) |
| *H04W 16/20* | (2009.01) |

(52) U.S. Cl.
CPC .......... *H04L 61/50* (2022.05); *H04L 61/5038* (2022.05); *H04L 61/5092* (2022.05); *H04W 4/025* (2013.01); *H04W 4/40* (2018.02); *H04W 4/48* (2018.02); *H04L 2101/627* (2022.05); *H04L 2101/69* (2022.05); *H04W 16/20* (2013.01)

(58) Field of Classification Search
CPC . H04L 61/50; H04L 61/5092; H04L 61/5038; H04W 4/40; H04W 4/48; H04W 4/025
See application file for complete search history.

(56) References Cited

U.S. PATENT DOCUMENTS

| | | | |
|---|---|---|---|
| 8,326,329 B2 | 12/2012 | Nilsson | |
| 8,774,829 B2 | 7/2014 | Farley et al. | |
| 10,448,203 B2 | 10/2019 | Bottazzi et al. | |
| 10,659,919 B1 | 5/2020 | Li et al. | |
| 2009/0089583 A1* | 4/2009 | Patel ...................... | H04L 9/0844 |
| | | | 713/171 |
| 2011/0021211 A1* | 1/2011 | Ohki ...................... | G01C 21/362 |
| | | | 455/456.3 |

(Continued)

*Primary Examiner* — Gregory Todd
(74) *Attorney, Agent, or Firm* — Frank Lollo; Brooks Kushman P.C.

(57) ABSTRACT

A first computer is connected to a communication network and is assigned a first network address on the communication network. A second computer is connected to the communication network and is assigned the first network address on the communication network. A first message, including the first network address and a request to generate a random number, is transmitted by the first computer via the communication network. A first reply message, including the random number, is received from the second computer in response to the request. A second network address is assigned for the second computer by the first computer based on the random number. A second message, including the second network address and the random number, is transmitted by the first computer via the communication network.

4 Claims, 8 Drawing Sheets

(56)     References Cited

U.S. PATENT DOCUMENTS

| | | | |
|---|---|---|---|
| 2012/0271924 A1* | 10/2012 | Spitaels | .............. H04L 61/5092 |
| | | | 709/220 |
| 2016/0112381 A1* | 4/2016 | Bhattacharyya | .... H04L 63/0428 |
| | | | 713/171 |
| 2016/0197944 A1* | 7/2016 | Allouche | ........... H04L 63/1416 |
| | | | 726/23 |
| 2017/0034167 A1* | 2/2017 | Figueira | ................ H04L 63/061 |
| 2017/0101054 A1* | 4/2017 | Dusane | ........... G08G 1/096741 |
| 2021/0288801 A1* | 9/2021 | Kulkarni | .............. H04L 9/0631 |

* cited by examiner

210

211                    212

213-1        213-2        213-3

215

216                    217

218-1        218-2        218-3

220

221 222

223-1 223-2 223-3

225

226 227

228-1 228-2 228-3

VEHICLE NETWORK ADDRESS ASSIGNMENT

BACKGROUND

Vehicles can be equipped with computers, networks, sensors, and/or controllers to acquire data regarding the vehicle's environment and/or to operate vehicle components. Vehicle sensors can provide data about a vehicle's environment, e.g., concerning routes to be traveled and objects in the vehicle's environment to be avoided. Various computers or controllers such as electronic control units (ECUs) can be provided in a vehicle and can communicate via a vehicle network. Messages sent and received via the vehicle network can relate to operating the vehicle, and can include sensor data, actuation commands, fault reports, etc. A computer can operate a vehicle and make real-time decisions based on relay messages received from sensors and/or other computers.

DETAILED DESCRIPTION

Figure 1:
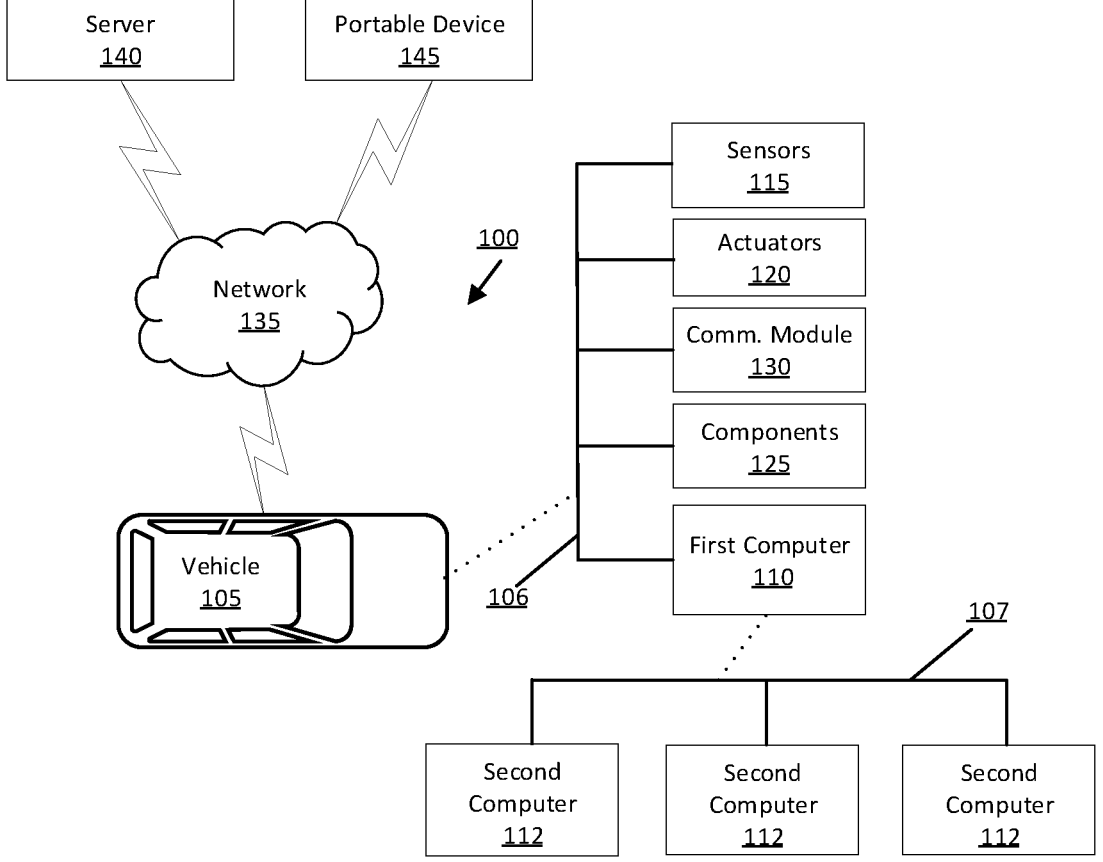
FIG. 1 is a block diagram for an example control system for a vehicle.

A user may authorize a portable device to control a vehicle. For example, a portable device may be able to initiate one or more vehicle functions, e.g., typically performed by a passive entry passive start (PEPS) system such as locking and unlocking doors, opening a liftgate, remotely starting the vehicle, etc., upon input to the portable device specifying the vehicle function(s) to be performed. A first computer in the vehicle can actuate one or more vehicle components to perform the vehicle function specified by the input. For example, one of a plurality of second computers can detect the portable device and receive the input from the portable device. The second computer can then provide a relay message to the first computer including the input. However, each of the plurality of second computers are typically assigned a first, i.e., common, network address such that the first computer may be unable to identify the second computer that provided the relay message. In this situation, the first computer may be unable to identify which vehicle component(s), e.g., a left front door, a right rear door, etc., to actuate to perform the specified vehicle function.

Advantageously, the first computer can assign a unique one of a plurality of second network addresses to respective second computers based on respective random numbers generated by the respective second computers, as discussed herein. Assigning the second network addresses to the second computers allows the first computer to communicate with each second computer individually. Communicating with each of the plurality of second computer individually allows the first computer to determine respective locations of the respective second computers. Determining a location of a second computer that provides a relay message including a request to perform the vehicle function(s) allows the first computer to determine the vehicle components to actuate to perform the requested vehicle function(s).

A system includes a communication network, a first computer connected to the communication network, and a second computer connected to the communication network. The first computer is assigned a first network address on the communication network, and the second computer is assigned the first network address on the communication network. The first computer is programmed to transmit, via the communication network, a first message including the first network address and a request to generate a random number. The first computer is further programmed to receive a first reply message from the second computer including the random number in response to the request. The first computer is further programmed to assign a second network address for the second computer based on the random number. The first computer is further programmed to transmit, via the communication network, a second message including the second network address and the random number.

The second computer can be programmed to transmit, via the communication network, the first reply message in response to the request. The second computer can be further programmed to assign the second network address to the second computer in response to the second message.

The second computer may be one of a plurality of second computers, and the first reply message may be one of a plurality of first reply messages including respective random numbers. The first computer can be further programmed to transmit respective second messages, each including respective second network addresses based on a unique one of the random numbers, for the respective second computers.

The first computer can be further programmed to transmit, via the communication network, a third message including the second network address and a second request to confirm the second network address. The first computer can be further programmed to receive a second reply message from the second computer including the second network address in response to the third message. The first computer can be further programmed to determine a location of the second computer based on the second reply message.

The second computer can be programmed to, upon determining the third message lacks the second network address, ignore the third message. The second computer can be further programmed to, upon determining the third message includes the second network address, transmit the second reply message, including the second network address, to the first computer.

The second computer can be programmed to transmit the second reply message via a short-range broadcast protocol.

The second computer can be programmed to transmit the second reply message via the communication network.

The first computer can be further programmed to, upon receiving, via a short-range broadcast protocol, the second reply message, determine the location of the second computer based on at least one of an angle-of-arrival measurement, a signal strength measurement, or a time-of-flight measurement of the second reply message.

The first computer can be further programmed to, upon receiving, via the communication network, the second reply message, determine the location of the second computer based on an amount of time to receive the second reply message after sending the second request.

The second computer may be one of a plurality of second computers, the first reply message may be one of a plurality of first reply messages including respective random numbers, and the second reply message may be one of a plurality of second reply messages including respective second network addresses. The first computer can be further programmed to transmit respective second messages, each including respective second network addresses based on a unique one of the random numbers, for the respective second computers. The first computer can be further programmed to transmit respective third messages, each including respective second network addresses, for the respective second computers. The first computer can be further programmed to determine respective locations for the respective second computers based on a unique one of the second reply message.

The first computer can be further programmed to assign a permanent network address for the second computer based on the location of the second computer. The first computer can be further programmed to transmit, via the communication network, a fourth message including the permanent network address and the second network address.

The second computer can be programmed to assign the permanent network address to the second computer in response to the fourth message. The second computer can be further programmed to, upon detecting a portable device within a distance threshold of the second computer, transmit a relay message, including the permanent network address, to the first computer.

The first computer can be further programmed to, upon receiving the relay message from the second computer, actuate a vehicle component based on the permanent network address.

The second computer may be one of a plurality of second computers, and the first reply message may be one of a plurality of first reply messages including respective random numbers. The first computer can be further programmed to transmit respective second messages, each including respective second network addresses based on a unique one of the random numbers, for the respective second computers. The first computer can be further programmed to transmit respective third messages, each including respective second network addresses, for the respective second computers. The first computer can be further programmed to transmit respective fourth messages, each including respective permanent network addresses based on a unique one of the locations, for the respective second computers.

A method includes, at a first computer, transmitting, via a communication network, a first message including a first network address and a request to generate a random number. The method further includes receiving a first reply message from a second computer including the random number in response to the request. The method further includes assigning a second network address for the second computer based on the random number. The method further includes transmitting, via the communication network, a second message including the second network address and the random number.

The method can further include transmitting, via the communication network, a third message including the second network address and a second request to confirm the second network address. The method can further include receiving a second reply message from the second computer including the second network address in response to the third message. The method can further include determining a location of the second computer based on the second reply message.

The method can further include, upon receiving, via a short-range broadcast protocol, the second reply message, determining the location of the second computer based on at least one of an angle-of-arrival measurement, a signal strength measurement, or a time-of-flight measurement of the second reply message The method can further include, upon receiving, via the communication network, the second reply message, determining the location of the second computer based on an amount of time to receive the second reply message after sending the second request.

The method can further include assigning a permanent network address for the second computer based on the location of the second computer. The method can further include transmitting, via the communication network, a fourth message including the permanent network address and the second network address.

The method can further include, upon receiving a relay message from the second computer including the permanent network address, actuating a vehicle component based on the permanent network address.

Further disclosed herein is a computing device programmed to execute any of the above method steps. Yet further disclosed herein is a computer program product, including a computer readable medium storing instructions executable by a computer processor, to execute an of the above method steps.

Figure 2A:
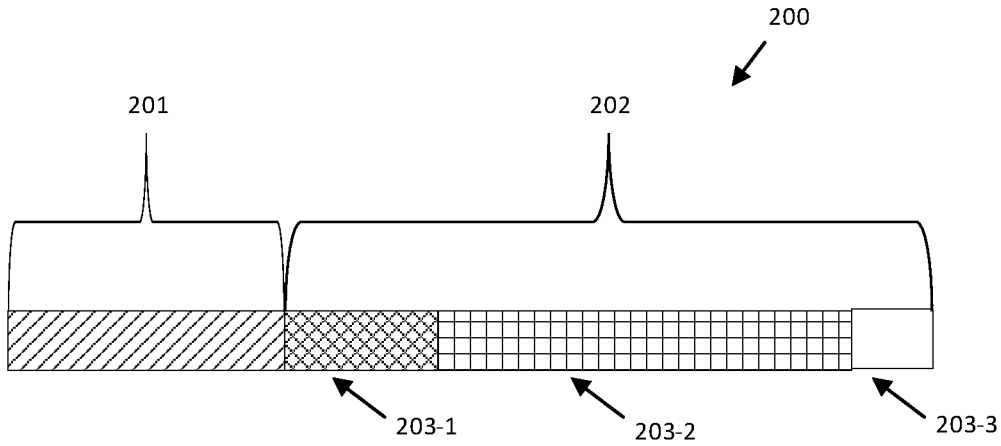
FIG. 2A is a block diagram illustrating an example first message.
Figure 2B:
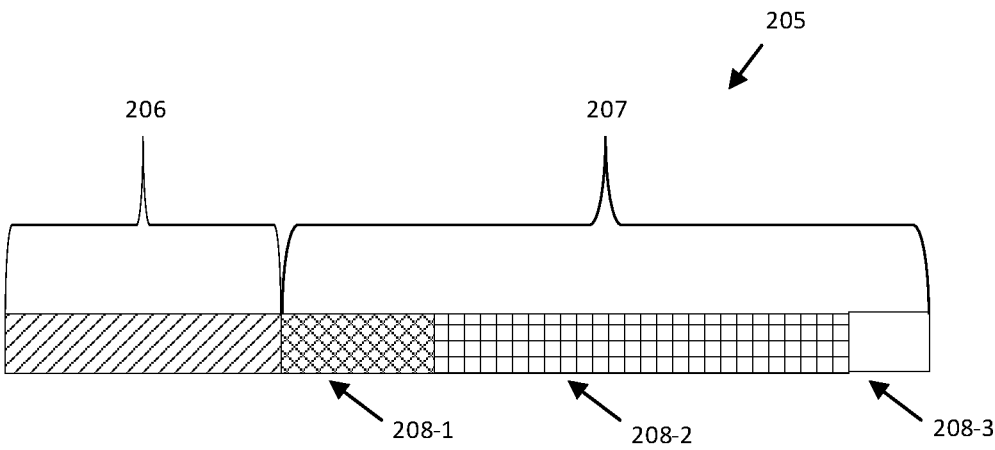
FIG. 2B is a block diagram illustrating an example second message.
Figure 2C:
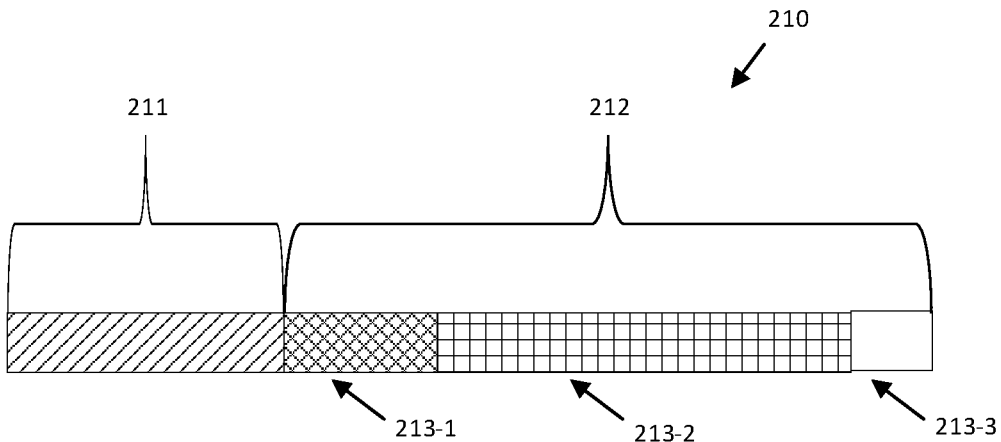
FIG. 2C is a block diagram illustrating an example third message.
Figure 2D:
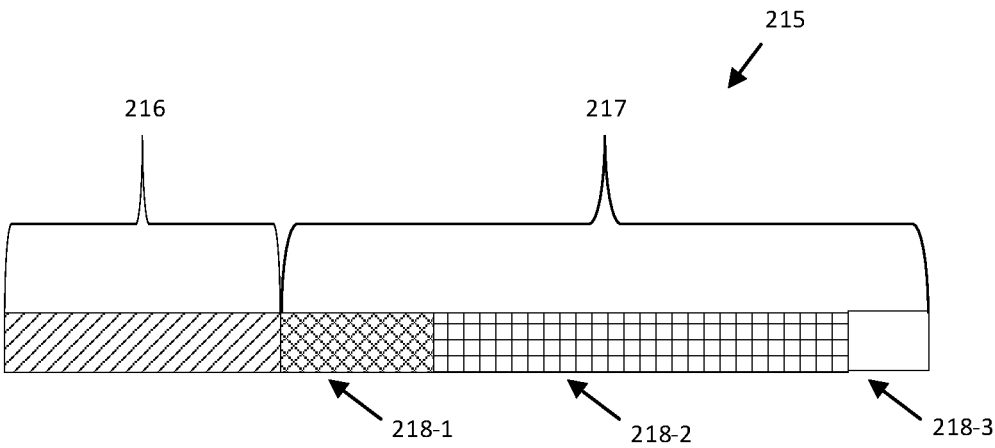
FIG. 2D is a block diagram illustrating an example fourth message.
Figure 2E:
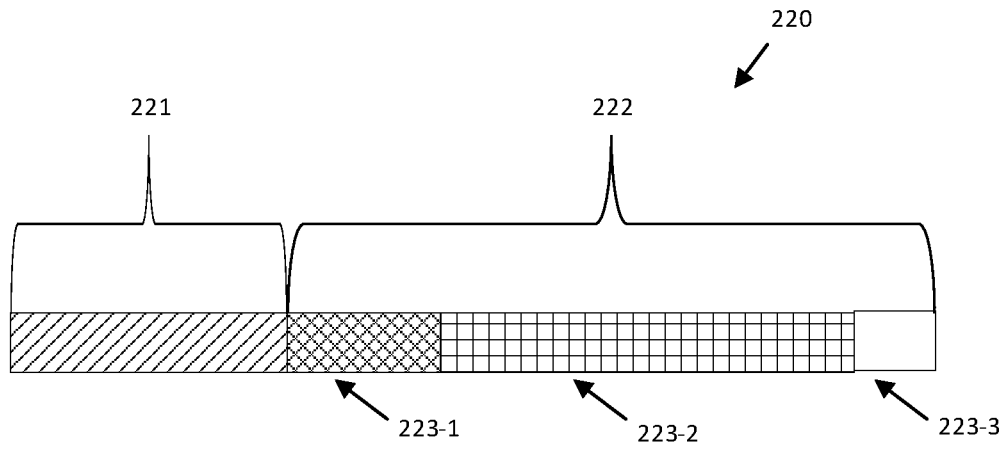
FIG. 2E is a block diagram illustrating an example first reply message.
Figure 2F:
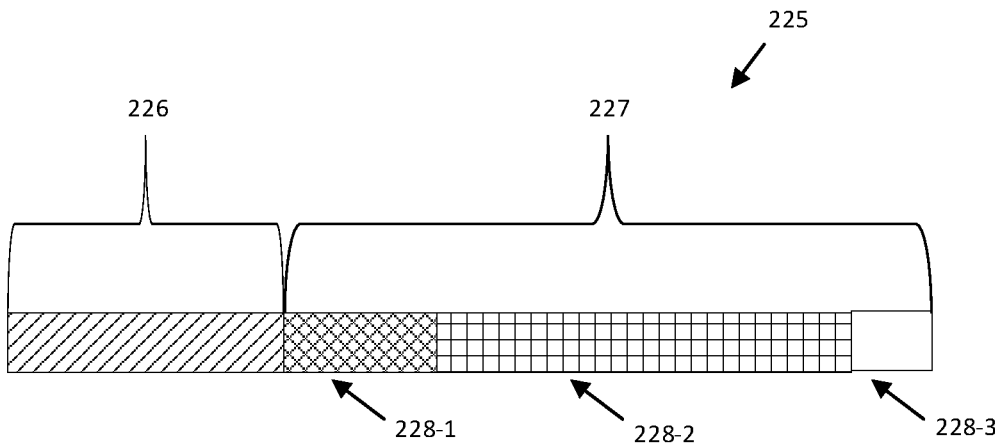
FIG. 2F is a block diagram illustrating an example second reply message.
Figure 2G:
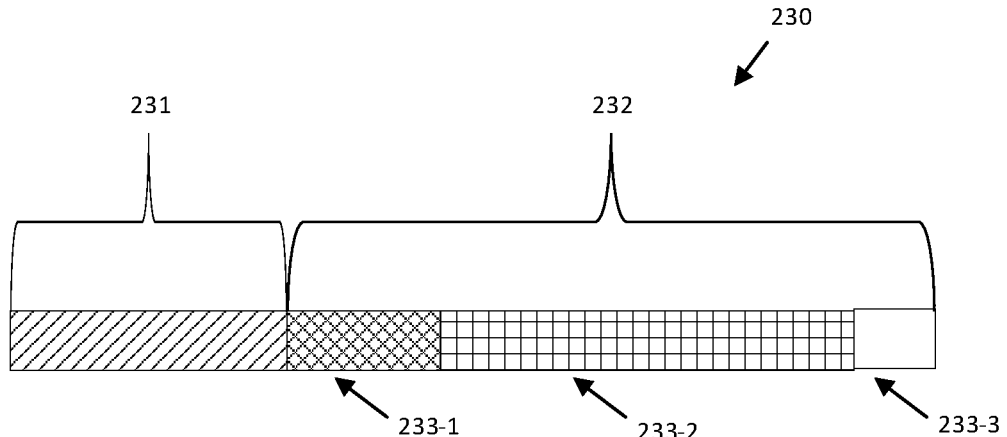
FIG. 2G is a block diagram illustrating an example relay message.

With reference to FIGS. 1-2G, an example control system 100 includes a vehicle 105. The control system 100 includes a communication network 107. A first computer 110 in the vehicle 105 is connected to the communication network 107 and is assigned a first network address on the communication network 107. A plurality of second computers 112 in the vehicle 105 are connected to the communication network 107 and are assigned the first network address on the communication network 107. In other words, the first network address is a common, i.e., default, network address assign to each of the computers 110, 112. The first computer 110 receives data from sensors 115 and the plurality of second computers 112. The first computer 110 is programmed to transmit, via the communication network 107, a first, i.e., detector, message 200 including the first network address and a request to generate a random number. The first computer 110 is further programmed to receive a first reply, i.e., random number, message 220 from a second computer 112 including the random number in response to the request. The first computer 110 is further programmed to assign a second network address for the second computer 112 based on the random number. The first computer 110 is further programmed to transmit, via the communication network 107, a second, i.e., identifier, message 205 including the second network address and the random number.

Turning now to FIG. 1, the vehicle 105 includes the first computer 110, the plurality of second computers 112, sensors 115, actuators 120 to actuate various vehicle components 125, and a vehicle communications module 130. The communications module 130 allows the computers 110 to communicate with a remote server computer 140, and/or other vehicles, e.g., via a messaging or broadcast protocol such as Dedicated Short Range Communications (DSRC), Ultra-Wideband (UWB), cellular, and/or other protocol that can support vehicle-to-vehicle, vehicle-to infrastructure, vehicle-to-cloud communications, or the like, and/or via a packet network 135.

The first computer 110 includes a processor and a memory such as are known. The memory includes one or more forms of computer-readable media, and stores instructions executable by the computer 110 for performing various operations, including as disclosed herein. The first computer 110 can further include two or more computing devices operating in concert to carry out vehicle 105 operations including as described herein. Further, the first computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor data. In another example, the first computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the first computer 110.

The first computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the first computer 110; in a semi-autonomous mode the first computer 110 control one or two of vehicle 105 propulsion, braking, and steering; in a non-autonomous mode a human operator controls each of vehicle 105 propulsion, braking, and steering.

The first computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the first computer 110, as opposed to a human operator, is to control such operations.

The first computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The first computer 110 are generally arranged for communications on a vehicle communication network 106, 107 that can include a bus in the vehicle 105 such as a controller area network (CAN) or the like, and/or other wired and/or wireless mechanisms.

Via the vehicle communication network 106, the first computer 110 may transmit messages to various devices in the vehicle 105 and/or receive messages (e.g., CAN messages) from the various devices, e.g., sensors 115, an actuator 120, ECUs, other computers, etc. Alternatively, or additionally, in cases where the first computer 110 actually comprises a plurality of devices, the vehicle communication network 106 may be used for communications between devices represented as the first computer 110 in this disclosure. Further, as mentioned below, various controllers and/or sensors 115 may provide data to the first computer 110 via the vehicle communication network 106.

Via the vehicle communication network 107, the first computer 110 may transmit messages to the plurality of second computers 112 and/or receive messages (e.g., CAN messages) from the plurality of second computers 112. The vehicle communication network 107 may be a limited access network such that a subset, i.e., some but less than all, of the devices in the vehicle 105 can communicate via the vehicle communication network 107. For example, only the first computer 110 and the plurality of second computers 112 may have access to, i.e., be able to transmit and/or receive messages via, the vehicle communication network 107.

Vehicle 105 sensors 115 may include a variety of devices such as are known, e.g., Light Detection And Ranging (LIDAR) sensor(s) 115, radar sensors 115, camera sensors 115, etc. to provide data to the first computer 110.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the first computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or short-range radio communications, etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. For convenience, the label "V2X" is used herein for communications that may be vehicle-to-vehicle (V2V) and/or vehicle-to-infrastructure (V2I), and that may be provided by communication module 130 according to any suitable short-range communications mechanism, e.g., DSRC, cellular, or the like.

The network 135 represents one or more mechanisms by which a first computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The plurality of second computers 112 each includes a respective second processor and a respective second memory such as are known. Each second memory includes one or more forms of computer-readable media, and stores instructions executable by the respective second computer 112 for performing various operations, including as disclosed herein. The second computers 112 may include a communications module that has features in common with the vehicle communications module 130. The communications module allows the second computer 112 to communicate with the first computer 110, e.g., via a messaging (e.g., CAN messages via the limited access communication network 107) or any suitable short-range broadcast protocol such as BLE, UWB, or the like.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

The portable device 145 can be a conventional computing device, i.e., including one or more processors and one or more memories, programmed to provide operations such as disclosed herein. The portable device 145 can be a portable device. A portable device 145 can be any one of a variety of computers that can be used while carried by a person, e.g., a smartphone, a tablet, a personal digital assistant, a smart watch, etc.

The portable device 145 includes a user interface. The user interface includes user input devices such as knobs, buttons, switches, pedals, levers, touchscreens, and/or microphones, etc. The input devices may include sensors to detect user inputs and provide user input data to a second computer 112. That is, the second computer 112 may be programmed to receive user input from the user interface. The user may provide each user input via the user interface, e.g., by pressing a virtual button on a touchscreen display, by providing voice commands, etc. For example, a touchscreen display included in the user interface may include sensors to detect that a user pressed a virtual button on the touchscreen display to initiate performance of a vehicle function, e.g., to unlock a door, to lock a door, to remotely start the vehicle, to open a liftgate, etc., which input can be received in the second computer 112 and used to determine the selection of the user input.

The user interface of a portable device 145 typically further includes output devices such as displays (including touchscreen displays), speakers, and/or lights, etc., that output signals or data to the user. Upon receiving data input from the user, the portable device 145 can transmit the specified data to the second computer 112, e.g., via a short-range broadcast protocol.

The first computer 110 is programmed to assign respective permanent network addresses to each of the plurality of second computers 112. A permanent network address is a network address that persists in non-volatile memory, e.g., of the first computer 110 and the respective second computer 112. Each permanent network address is associated with a location in the vehicle 105 of a second computer 112 assigned the respective permanent network address. To assign respective permanent network addresses to each of the plurality of second computers 112, the first computer 110 detects each of the plurality of second computers 112 and determines respective locations of the second computers 112, as discussed below.

To detect each of the second computers 112, the first computer 110 generates a detector message 200. A detector message 200 includes a header 201 and a payload 202 (see FIG. 2A). The header 201 of the detector message 200 includes the first network address. The header 201 may include a message type, a message size, etc. The payload 202 may include various data, i.e., message content. The payload 202 can include sub-payloads or payload segments 203-1, 203-2, 203-3 (collectively, referred to as payload segments 203). The respective payload segments 203 in FIG. 2A are illustrated as being of different lengths to reflect that different payload segments 203 may include various amounts of data, and therefore may be of different sizes, i.e., lengths. The payload 202 of the detector message 200 includes a request to generate a random number, e.g., in a specified payload segment 203.

The first computer 110 can provide the detector message 200 to the plurality of second computers 112. For example, the first computer 110 can transmit the detector message 200 to the plurality of second computers 112 via the limited access communication network 107. Each of the plurality of second computers 112 can provide a random number message 220 in response to the detector message 200, as discussed below.

The first computer 110 can receive random number messages 220 from each of the plurality of second computers 112. Specifically, each second computer 112 provides a unique random number message 220, as discussed below. Each random number message 220 includes, e.g., in a specified payload segment 222, a random number generated by the respective second computer 112. The first computer 110 is programmed to identify each of the random numbers generated by the plurality of second computers 112, e.g., based on the specified payload segment 222 of the respective random number message 220. For example, upon receiving a random number message 220 from a second computer 112, the first computer 110 can access the specified payload segment 222 and retrieve the random number generated by the second computer 112.

The first computer 110 can receive at least some of random number messages 220, e.g., via a short-range broadcast protocol. Additionally, or alternatively, the first computer 110 can receive at least one of the random number messages 220, e.g., via the limited access communication network 107. As one example, the first computer 110 can receive all of the random number messages 220 via the limited access communication network 107 or the short-range broadcast protocol. As another example, the first computer 110 can receive one random number message 220 via the limited access communication network 107 and the remaining random number messages 220 via the short-range broadcast protocol. In such an example, the first computer 110 can determine that the random number message 220 received via the limited access communication network 107 corresponds to a non-wireless second computer 112. A non-wireless second computer 112 is a second computer 112 that is unable to communicate via the short-range broadcast protocol. For example, the second computer 112 may lack a wireless protocol or may include a near field communication (NFC) protocol and be located outside of the range of the NFC protocol relative to the first computer 110.

Upon identifying the plurality of random numbers, the first computer 110 can assign second network addresses to each of the plurality of random numbers. For example, the first computer 110 can maintain a list, a table, a queue, or the like of available second network addresses. The list can be stored in a memory of the first computer 110. Each second network address is assigned based on a unique one of the random numbers. For example, the first computer 110 can assign available second network addresses based on an order in which the plurality of random number messages 220 are received. In such an example, upon identifying a random number in a random number message 220, the first computer 110 can incrementally assign a next available second network address from the list to the identified random number. The first computer 110 can continue assigning available second network addresses in this manner until all identified random numbers are assigned a respective second network address.

Upon assigning second network addresses to each of the plurality of random numbers, the first computer 110 can generate an identifier message 205. Similar to the detector message 200, the identifier message 205 includes a header 206 and a payload 207, including payload segments 208 (see FIG. 2B). The header 206 of the identifier message 205 includes the first network address. The payload 207 includes the random number(s) generated by the second computer 112(s) and the second network address(es) assigned to the random number(s).

For example, the first computer 110 can generate one identifier message 205. In such an example, the payload 207 of the identifier message 205 includes the plurality of random numbers and the plurality of second network addresses assigned to the random numbers. For example, each random number and the corresponding second network address assigned to the respective random number may be included in a unique one of the payload segments 208. That is, each payload segment 208 of the identifier message 205 may include one random number and the second network address assigned to the one random number.

Alternatively, the first computer 110 can generate a plurality of identifier messages 205. Specifically, the first computer 110 can generate one identifier message 205 for each random number. In such an example, the payload 207 of each identifier message 205 may include a unique one of the random numbers and the corresponding second network address assign to the respective random number, e.g., in a specified payload segment 208.

Upon generating the identifier message 205(s), the first computer 110 can provide the identifier message 205(s) to the plurality of second computers 112. For example, the first computer 110 can transmit the identifier message 205(s) to the plurality of second computers 112 via the limited access communication network 107. In the example in which the first computer 110 generates a plurality of identifier messages 205, the first computer 110 can transmit the identifier messages 205 via the limited access communication network 107 one at a time. In such an example, the first computer 110 can transmit one of the identifier messages 205 via the limited access communication network 107. The first computer 110 can then transmit another of the identifier messages 205 via the limited access communication network 107, e.g., upon receiving a confirmation from one of the second computers 112 that the one identifier message 205 was received, upon expiration of a timer, etc. The first computer 110 can continue to transmit identifier messages 205 in this manner until all identifier messages 205 are transmitted.

To determine respective locations of each of the second computers 112, the first computer 110 generates a plurality of third, i.e., locator, messages 210. Similar to the detector message 200, each locator message 210 includes a header 211 and a payload 212, including payload segments 213 (see FIG. 2C). The header 211 of each locator message 210 includes a unique one of the second network addresses for the respective second computer 112. That is, the first computer 110 generates a respective locator message 210 for each second computer 112. The payload 212 of each locator message 210 includes a second request to confirm the unique one of the second network addresses, e.g., in a specified payload segment 213.

Upon generating the plurality of locator messages 210, the first computer 110 can provide the respective locator message 210 to the respective second computer 112. The first computer 110 transmits the plurality of locator messages 210, e.g., via the limited access communication network 107, one at a time. For example, the first computer 110 can transmit a locator message 210 to a corresponding second computer 112 via the limited access communication network 107. Upon receiving a second reply, i.e., destination, message 225 from the respective second computer 112 in response to the locator message 210, the first computer 110 transmits a next locator message 210 to the respective second computer 112. The first computer 110 can continue to transmit locator messages 210 in this manner until all locator messages 210 are transmitted.

The first computer 110 can receive destination messages 225 from each of the plurality of second computers 112. Specifically, each second computer 112 provides a unique destination message 225 in response to the respective locator message 210, as discussed below. The first computer 110 is programmed to confirm the second network address assigned to the respective second computer 112 based on the respective destination message 225. For example, upon receiving a destination message 225 from a second computer 112, the first computer 110 can access the header 226 and retrieve the second network address. The first computer 110 can then compare the retrieved second network address to the second network address provided in the corresponding locator message 210. If the retrieved second network address matches the provided second network address, then the first computer 110 can determine that the second network address is confirmed. If the retrieved second network address does not match the provided second network address, then the first computer 110 can ignore the destination message 225.

Upon confirming the second network addresses for the second computers 112, the first computer 110 can determine respective locations of the second computers 112 based on the respective destination messages 225. As one example, the first computer 110 can receive a destination message 225 via a short-range broadcast protocol, e.g., UWB, BLE, etc. In such an example, the first computer 110 can determine the location of the respective second computer 112 based on a distance from the first computer 110 to the respective second computer 112 and a direction of propagation of the respective destination message 225. For example, the first computer 110 can determine the location of the respective second computer 112 by combining, e.g., using geometric transformation, the distance from the first computer 110 to the respective second computer 112 and the direction of propagation to a location of the first computer 110, e.g., stored in a memory of the first computer 110.

The first computer 110 can determine the direction of propagation of a destination message 225 based on an angle-of-arrival measurement. During an angle of arrival measurement, the first computer 110 can determine the direction of propagation of the destination message 225 incident on the first computer 110 and measuring a time distance of arrival between elements of the destination message 225 at the first computer 110.

The first computer 110 can determine the distance from a second computer 112 to the first computer 110 based on a time-of-flight measurement and/or a signal strength measurement of the second reply. For example, the first computer 110 can use time-of-flight measurement or the signal strength measurement to determine the distance from the second computer 112 to the first computer 110. As another example, the first computer 110 can use time-of-flight measurement and the signal strength measurement to determine the distance. In such an example, the first computer 110 can combine, e.g., by averaging, the distances determined from the time-of-flight measurement and the signal strength measurement to determine the distance from the second computer 112 to the first computer 110. Alternatively, the first computer 110 can determine the distance from the first computer 110 to the respective second computer 112 based on sending test messages via the short-range broadcast protocol, e.g., by employing symmetrical double-sided two-ray ranging techniques.

During a time-of-flight measurement, the first computer 110 calculates a distance from the first computer 110 to the respective second computer 112 based on a time measurement between transmission of the locator message 210 and receipt of the destination message 225.

During a signal strength measurement, the first computer 110 can determine a distance from the first computer 110 to the respective second computer 112 by determining a received signal strength indicator (RSSI). Upon determining the RSSI, the first computer 110 can access a look-up table that associates various RSSI's with various distances from the first computer 110. The first computer 110 can determine the distance between the second computer 112 and the first computer 110 by selecting a stored RSSI that matches the determined RSSI.

An RSSI is a measure of the strength or amplitude of a received wireless signal. Wireless signals are typically transmitted as an electromagnetic carrier wave at a particular frequency, which can be a radio frequency in the range from 232 MHz to 232 GHz, for example. The carrier wave is then modulated by phase and/or frequency shifting to encode data into the carrier wave. A wireless receiver demodulates the phase and/or frequency shift to extract data from the carrier wave. The carrier wave can be rectified and averaged over a specified time period, for example one microsecond, to determine an RSSI. The RSSI is inversely related to the distance between the first computer 110 and the respective second computer 112. That is, the RSSI for a destination message 225 transmitted by a second computer 112 that is farther from the first computer 110 than another second computer 112 will be lower than the RSSI for a destination message 225 transmitted by the other second computer 112.

As another example, the first computer 110 can receive a destination message 225 via the limited access communication network 107. In such an example, the first computer 110 can determine the location of the respective second computer 112 based on an amount of time to receive the destination message 225 after sending the respective locator message 210. That is, upon transmitting the respective locator message 210 to the respective second computer 112, the first computer 110 can initiate a timer. The first computer 110 can stop the timer upon receiving the destination message 225.

The first computer 110 can determine a length of a wire between the first computer 110 and the respective second computer 112 by multiplying the amount of time specified by the timer upon receiving the respective destination message 225 and a speed of messages through the wire. The speed of messages through the wire may be determined based on a material of the wire, e.g., optic fiber, copper, etc. The first computer 110 is communicatively connected to each of the plurality of second computers 112 via a plurality of wires. Each wire connects one respective second computer 112 to the first computer 110. Each wire has a different length. The first computer 110 can maintain a look-up table, or the like, that associates various lengths of wires with corresponding locations within the vehicle 105. The look-up table may be stored, e.g., in a memory of the first computer 110. Upon determining the length of the wire between the first computer 110 and the respective second computer 112, the first computer 110 can determine the location of the respective second computer 112 using the look-up table. That is, the first computer 110 can compare the determined length to the stored lengths and select the location associated with the stored length that matches the determined length.

As another example, the first computer 110 can determine a location of a second computer 112 based on determining that the second computer 112 is the non-wireless second computer 112 (as discussed above). For example, the vehicle 105 may include one non-wireless second computer 112, and the location of the non-wireless second computer 112 may be stored, e.g., in a memory of the first computer 110. In such an example, upon determining that the second computer 112 is the non-wireless second computer 112, the first computer 110 can access the memory to retrieve the location of the non-wireless second computer 112.

Upon determining respective locations of the second computers 112, the first computer 110 can assign respective permanent network addresses to each of the plurality of second computers 112. For example, the first computer 110 can maintain a look-up table that associates various locations with corresponding permanent network addresses. In this situation, the first computer 110 can assign a permanent network address to a second computer 112 based on the location of the second computer 112 matching the stored location associated with the permanent network address. The look-up table may be stored, e.g., in a memory of the first computer 110.

Upon assigning the permanent network addresses to respective second computers 112, the first computer 110 is programmed to generate a plurality of fourth, i.e., assignment, messages 215. Similar to the detector message 200, each assignment message 215 includes a header 216 and a payload 217, including payload segments 218 (see FIG. 2D). The header 216 of each assignment message 215 includes a unique one of the second network addresses. That is, the first computer 110 generates a respective assignment message 215 for each second computer 112. The payload 217 of each assignment message 215 includes the permanent network address assigned to the respective second computer 112, e.g., in a specified payload segment 218.

Upon generating the plurality of assignment messages 215, the first computer 110 can provide the assignment messages 215 to the respective second computers 112. For example, the first computer 110 can transmit the assignment messages 215 to the respective second computers 112 via the limited access communication network 107, e.g., in substantially the same manner as discussed above regarding transmission of the locator messages 210. The plurality of second computers 112 can provide a relay message 230 in response to the assignment message 215, as discussed below.

Upon receiving a relay message 230 from a second computer 112, the first computer 110 is programmed to identify the second computer 112 based on the relay message 230. For example, the first computer 110 can access the header 231 of the relay message 230 and retrieve the permanent network address. The first computer 110 can then determine one or more vehicle components 125 proximate, e.g., nearest, the identified second computer 112. For example, the first computer 110 may maintain a look-up table that associates various vehicle components 125 with corresponding permanent network addresses. The look-up table may be stored, e.g., in a memory of the first computer 110. The first computer 110 can determine the various vehicle components 125 using the look-up table by selecting the vehicle components 125 associated with the stored permanent network address that matches the retrieved permanent network address.

The first computer 110 may be programmed to actuate the vehicle component 125(s) associated with the identified second computer 112 based on the relay message 230. For example, the first computer 110 can access a specified payload segment 233 of the relay message 230 and retrieve a request to perform one or more vehicle functions (as discussed below), e.g., unlocking a door, locking a door, opening a liftgate, remotely starting the vehicle 105, etc. The first computer 110 can then actuate the vehicle component 125(s) according to the request. For example, the request can specify to lock or unlock a vehicle 105 door. In such an example, the first computer 110 can actuate locks for a vehicle 105 door proximate the identified second computer 112.

The plurality of second computers 112 in the control system detect a portable device 145 within a predetermined distance of the respective second computer 112, as discussed below. The vehicle 105 can include other computing devices, such as ECUs, including on the limited access communication network 107, that do not detect a portable device 145 within the predetermined distance of the computing device.

The second computers 112 can receive the detector message 200 from the first computer 110. The second computers 112 are programmed to identify the request to generate a random number, e.g., based on a specified payload segment 203 of the detector message 200. For example, upon receiving the detector message 200 from the first computer 110, the second computers 112 can access the specified payload segment 203 and retrieve the request to generate a random number.

The second computers 112 are programmed to generate a random number in response to the request. Each second computer 112 can generate a respective random number using a random number generator. A "random number generator" is an algorithm that generates a sequence of numbers when seeded with an initial value. That is, the random number generator (RNG) is a deterministic algorithm that generates a specified sequence for each initial seed number; in the context of the present document, references to a random number generator are to what is understood as a "pseudo-random number generator," i.e., a number generator that generates a sequence of numbers based on an initial seed number. Said differently, a second computer 112 can generate a sequence of random (or pseudorandom) numbers based on the initial seed number by using the RNG. The RNG can be a conventional algorithm, e.g., a Lehmer generator, a Mersenne Twister, an Advanced Randomization System, Philox, etc. In this document, "seed" has its conventional meaning in the computer arts, i.e., in the present context, to "seed" means specifying an initial condition of the RNG algorithm, which initializes the random number generator to generate a specific sequence of numbers based on the specific initial condition, i.e., seed value.

Upon generating the random number, each second computer 112 can generate a unique one of the plurality of random number messages 220. Similar to the detector message 200, each random number message 220 includes a header 221 and a payload 222, including payload segments 223 (see FIG. 2E). The header 221 of each random number message 220 includes the first network address. The payload 222 of each random number message 220 includes a unique one of the plurality of random numbers, e.g., in a specified payload segment 223. Specifically, the payload 222 of a random number message 220 generated by a second computer 112 includes the random number generated by the second computer 112.

Upon generating the random number message 220, each second computer 112 can provide the respective random number messages 220 to the first computer 110. For example, at least some of the second computers 112 can transmit a respective random number message 220 to the first computer 110 via the limited access communication network 107. Additionally, or alternatively, at least some of the second computers 112 can transmit a respective random number message 220 to the first computer 110 via the short-range broadcast protocol.

The second computers 112 can receive one or more identifier messages 205 from the first computer 110. The second computers 112 are programmed to determine the second network address assigned to the respective second computer 112, e.g., based on the random number generated by the respective second computer 112. In an example in which the first computer 110 provides one identifier message 205, each second computer 112 can identify the payload segment 208 that includes the random number generated by the respective second computer 112, i.e., included in the payload 222 of the respective random number message 220. The second computers 112 can then access the identified payload segment 208 and retrieve the respective second network address assigned to the random number for the respective second computer 112.

In an example in which the first computer 110 provides a plurality of identifier messages 205, the second computers 112 are programmed to select one of the identifier messages 205 based on a network address, whereby typically a one of the messages 205 selected by one of the second computers 112 will not be selected by any other second computer 112. For example, upon detecting a identifier message 205, a second computer 112 can access the specified payload segment 208 and identify the random number included in the specified payload segment 208. If the random number is different than the random number generated by the second computer 112, then the second computer 112 ignores the identifier message 205. If the random number is the same as the random number generated by the second computer 112, then the second computer 112 retrieves the second network address assigned to the random number. Upon retrieving the second network address, the second computer 112 can overwrite the first network address and store the retrieved second network address, e.g., in a memory. That is, the second computer 112 assigns the retrieved second network address to itself.

The second computers 112 can receive a plurality of the locator messages 210 from the first computer 110. The second computers 112 are programmed to select one of the locator messages 210 based on a network address, whereby typically a one of the messages 210 selected by one of the second computers 112 will not be selected by any other second computer 112. For example, upon detecting a locator message 210, the second computer 112 can access the header 211 and determine a network address included in the header 211. Upon determining that the network address is not the respective second network address for the respective second computer 112, the second computer 112 ignores the locator message 210.

Upon determining that the network address is the respective second network address for the respective second computer 112, each second computer 112 can generate a destination message 225. Similar to the detector message 200, the destination message 225 includes a header 226 and a payload 227, including payload segments 228 (see FIG. 2F). The header 226 includes the respective second network address for the respective second computer 112. The payload 227 may include a confirmation of the respective second network address for the respective second computer 112, e.g., in a specified payload segment 228.

Upon generating the destination message 225, each second computer 112 can provide the respective destination message 225 to the first computer 110. As one example, a second computer 112 can transmit the respective destination message 225 to the first computer 110 via the limited access communication network 107. As another example, a second computer 112 can transmit the respective destination message 225 to the first computer 110 via the short-range broadcast protocol. The first computer 110 can then determine a location of the respective second computer 112 based on the respective destination message 225, as discussed above.

The second computers 112 can receive a plurality of assignment messages 215 from the first computer 110. The second computers 112 are programmed to select one of the assignment messages 215, e.g., in substantially the same manner as discussed above regarding selecting a locator message 210. The second computers 112 are programmed to determine the respective permanent network address assigned to the respective second computer 112, e.g., based on the specified payload segment 218. For example, upon selecting the respective assignment message 215, each second computer 112 can access the specified payload segment 218 and retrieve the respective permanent network address. Upon determining the respective permanent network address for the respective second computer 112, the second computers 112 can assign the respective permanent network address to the respective second computer 112.

The second computers 112 may be programmed to transmit, e.g., via a short-range broadcast protocol, a radio frequency (RF) signal, e.g., BLE, UWB, etc. Each of the second computers 112 can detect a portable device 145 based on detecting the return of the respective transmitted RF signal. Further, the second computers 112 can determine a distance between the detected portable device 145 and the respective second computer 112 by using a time-of-flight measurement. For example, the second computers 112 can calculate the distance based on an amount of time between transmission of the RF signal and detecting the return of the transmitted RF signal.

Upon detecting a portable device 145, a second computer 112 can compare the distance between the portable device 145 and the second computer 112 to a distance threshold. The distance threshold specifies a maximum distance from a vehicle component 125 associated with the second computer 112 within which the first computer 110 can actuate the vehicle component(s) 125 based on a request from the portable device 145. The distance threshold may be determined based on the vehicle components 125 proximate the second computer 112. That is, the distance threshold may be different for different second computers 112. For example, the distance threshold may be greater for a second computer 112 proximate a vehicle 105 door than a second computer 112 proximate an ignition. The distance threshold may be stored, e.g., in a memory of the second computer 112.

If the distance is greater than the distance threshold, then the second computer 112 can ignore the detected portable device 145. If the distance is less than or equal to the distance threshold, then the second computer 112 can authorize the portable device 145, e.g., to prevent an unauthorized user from accessing the vehicle 105. The second computer 112 may be programmed to authorize the portable device 145 based on a key, e.g., a combination of numbers and/or characters, received from the portable device 145. For example, the vehicle 105 computer may authorize the portable device 145 based on determining the received key matches an expected key, e.g., known to certain parties such as vehicle 105 distributors, e.g., dealers, stored in the memory of the vehicle 105 computer.

Upon authorizing the portable device 145, the second computer 112 can generate a relay message 230. Similar to the detector message 200, the relay message 230 includes a header 231 and a payload 232, including payload segments 233 (see FIG. 2G). The header 231 includes the permanent network address for the second computer 112. The payload 232 of the relay message 230 may include a request to perform one or more vehicle functions. The second computer 112 may, for example, receive the request from the portable device 145 and may include the request in the payload 232, e.g., in a specified payload segment 233, of the relay message 230.

Upon generating the relay message 230, the second computer 112 can provide the relay messages 230 to the first computer 110. For example, the second computer 112 can transmit the relay message 230 to the first computer 110 via the limited access communication network 107. The first computer 110 can then actuate a vehicle component 125 based on the relay message 230, as discussed above.

The portable device 145 is programmed to generate the request to perform the vehicle function(s) based on a user input selecting the vehicle function(s). For example, the portable device 145 may actuate the user interface to detect a user input selecting the vehicle function(s). For example, the user interface may be programmed to display a virtual button on a touchscreen display that the user can touch or press to select the function(s). In other words, the user interface may activate sensors that can detect the user pressing the virtual button to select the vehicle function(s). Upon detecting the user input, the user interface can then provide the user input to the portable device 145, and the portable device 145 can select the vehicle function(s). Upon selecting the vehicle function(s), the portable device 145 can transmit a request to perform the vehicle function(s), e.g., via a short-range broadcast protocol, to the second computer 112. Additionally, in a same or different transmission as the request, the portable device 145 can transmit the key, e.g., via the short-range broadcast protocol, to the second computer 112.

Figure 3:
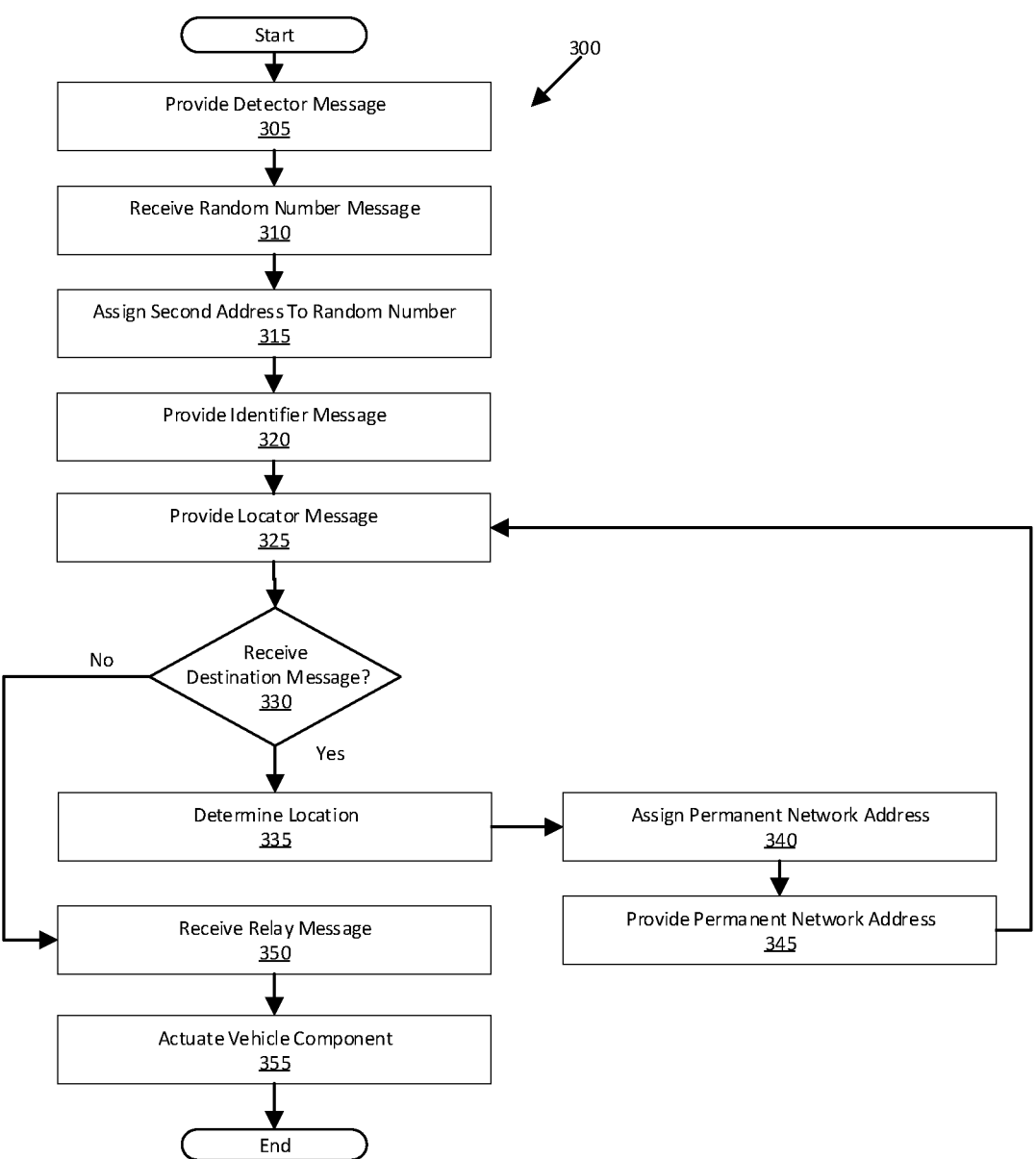
FIG. 3 is a flowchart of an example process for updating network addresses for each of a plurality of second computers.

FIG. 3 is a diagram of an example process 300 for updating network addresses to each of a plurality of second computers 112 in a vehicle 105. The process 300 begins in a block 305. The process 300 can be carried out by a first computer 110 included in the vehicle 105 executing program instructions stored in a memory thereof.

In the block 305, the first computer 110 provides a detector message 200 to the plurality of second computers 112. The detector message 200 includes a first network address and a request to generate a random number, as discussed above. Upon generating the detector message 200, the first computer 110 can transmit the detector message 200 via a limited access communication network 107, as discussed above. The process 300 continues in a block 310.

In the block 310, the first computer 110 monitors the limited access communication network 107 to detect a plurality of random number messages 220. Each random number message 220 corresponds to a respective second computer 112. That is, the first computer 110 receives a unique random number message 220 from each second computer 112. Each random number message 220 includes a unique random number, as discussed above. The first computer 110 can retrieve the random number from the respective random number message 220, as discussed above. The process 300 continues in the block 315.

In the block 315, the first computer 110 assigns second network addresses to each of the plurality of random numbers, as discussed above. That is, a unique second network address is assigned to each random number. The process 300 continues in a block 320.

In the block 320, the first computer 110 provides one or more identifier messages 205. As discussed above, the first computer 110 can provide one identifier message 205 to the plurality of second computers 112, or the first computer 110 can provide respective identifier messages 205 to each of the plurality of second computers 112. The identifier message(s) 205 include(s) the random number(s) and the second network address(es) assigned to the respective random number(s), as discussed above. Upon generating the identifier message(s) 205, the first computer 110 can transmit the identifier message(s) 205 via the limited access communication network 107, as discussed above. The process 300 continues in a block 325.

In the block 325, the first computer 110 provides locator messages 210 to each of the plurality of second computers 112. That is, the first computer 110 provides a unique locator message 210 to each second computer 112. Each locator message 210 includes respective second network addresses for the second computers 112 and a second request to confirm the respective second network address, as discussed above. Upon generating a respective locator message 210, the first computer 110 can transmit the respective locator message 210 via the limited access communication network 107, as discussed above. The process 300 continues in a block 330.

In the block 330, the first computer 110 determines whether a destination message 225 is received. As discussed above, the first computer 110 can receive the destination message 225 via the short-range broadcast protocol or the limited access communication network 107. The first computer 110 can monitor the short-range broadcast protocol and the limited access communication network 107 to detect one or more destination messages 225. A destination message 225 corresponds to a respective second computer 112. That is, the first computer 110 receives a unique destination message 225 from each second computer 112. If the first computer 110 detects a destination message 225, then the process 300 continues in a block 335. Otherwise, the process 300 continues in a block 350.

In the block 335, the first computer 110 determines respective locations for each of the plurality of second computers 112 based on respective destination messages 225, as discussed above. The process 300 continues in a block 340.

In the block 340, the first computer 110 assigns permanent network addresses to each of the plurality of second computer 112 based on the respective locations, as discussed above. That is, a unique permanent network address is assigned to each second computer 112. The process 300 continues in a block 345.

In the block 345, the first computer 110 provides assignment messages 215 to each of the plurality of second computers 112. That is, the first computer 110 provides a unique assignment message 215 to each second computer 112. Each assignment message 215 includes respective permanent network addresses for the second computers 112, as discussed above. Upon generating the respective assignment message 215, the first computer 110 can transmit the respective assignment message 215 via the limited access communication network 107, as discussed above. The process 300 returns to the block 325.

In the block 350, the first computer 110 monitors the limited access communication network 107 to detect a relay message 230. The relay message 230 includes the permanent network address of the respective second computer 112 and a request to perform one or more vehicle functions, as discussed above. The process 300 continues in a block 355.

In the block 355, the first computer 110 actuates one or more vehicle components 125 based on the relay message 230. Specifically, the first computer 110 actuates the vehicle component(s) 125 to perform the request vehicle function(s). As discussed above, the first computer 110 can determine the vehicle component(s) 125 to actuate based on the permanent network address of the second computer 112 that provided the relay message 230. The process 300 ends following the block 355.

Figure 4A:
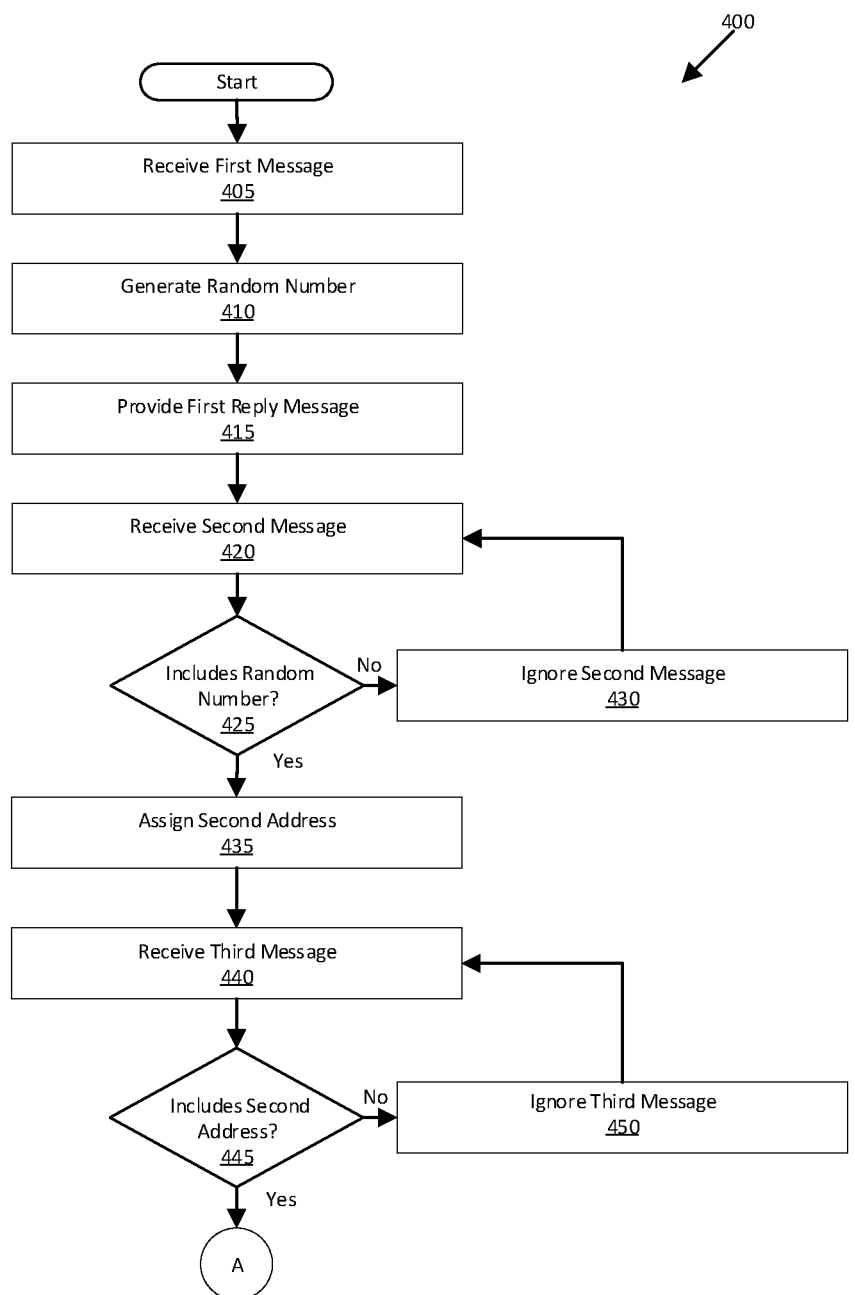
FIG. 4A is a first part of a flowchart of an example process for updating a network address in a second computer.

FIG. 4A is a first portion of a flowchart of an example process 400 (the second portion being shown in FIG. 4B because the entire flowchart will not fit on a single drawing sheet) for updating a network address for a second computer 112 in a vehicle 105. The process 400 begins in a block 405. The process 400 can be carried out by a second computer 112 included in the vehicle 105 executing program instructions stored in a memory thereof.

In the block 405, the second computer 112 monitors a limited access communication network 107 to detect a detector message 200. The detector message 200 includes a first network address and a request to generate a random number, as discussed above. The second computer 112 can retrieve the request from the detector message 200, as discussed above. The process 400 continues in the block 410.

In the block 410, the second computer 112 generates a random number, as discussed above. The process 400 continues in a block 415.

In the block 415, the second computer 112 provides a random number message 220 to the first computer 110. The random number message 220 includes the random number generated in the block 410. Upon generating the random number message 220, the second computer 112 can transmit the random number message 220 via one of a short-range broadcast protocol or the limited access communication network 107, as discussed above. The process 400 continues in a block 420.

In the block 420, the second computer 112 monitors a limited access communication network 107 to detect an identifier message 205. The identifier message 205 includes a random number and a second network address assigned to the random number, as discussed above. The second computer 112 can retrieve the random number from the identifier message 205, as discussed above. The process 400 continues in the block 425.

In the block 425, the second computer 112 determines whether the identifier message 205 includes the random number generated by the second computer 112. Upon retrieving the random number from the identifier message 205, the second computer 112 compares the retrieved random number to the random number provided via the random number message 220. If the retrieved random number matches the provided random number, then the process 400 continues in a block 435. Otherwise, the process 400 continues in a block 430.

In the block 430, the second computer 112 ignores the identifier message 205. That is, the second computer 112 determines not to assign the second network address included in the identifier message 205 to the second computer 112. The process 400 returns to the block 420.

In the block 435, the second computer 112 assigns the second network address assigned to the random number to the second computer 112. The second computer 112 can retrieve the second network address assigned to the random number from the identifier message 205, as discussed above. The process continues in a block 440.

In the block 440, the second computer 112 monitors a limited access communication network 107 to detect a locator message 210. The locator message 210 includes a second network address and a second request to confirm the second network address for the second computer 112, as discussed above. The second computer 112 can retrieve the second network address from the locator message 210, as discussed above. The process 400 continues in the block 445.

In the block 445, the second computer 112 determines whether the locator message 210 includes the second network address for the second computer 112. Upon retrieving the second network address from the locator message 210, the second computer 112 compares the retrieved second network address to the second network address assigned to the second computer 112. If the retrieved second network address matches the assigned second network address, then the process 400 continues in a block 455. Otherwise, the process 400 continues in a block 450.

In the block 450, the second computer 112 ignores the locator message 210. The process 400 returns to the block 440.

Figure 4B:
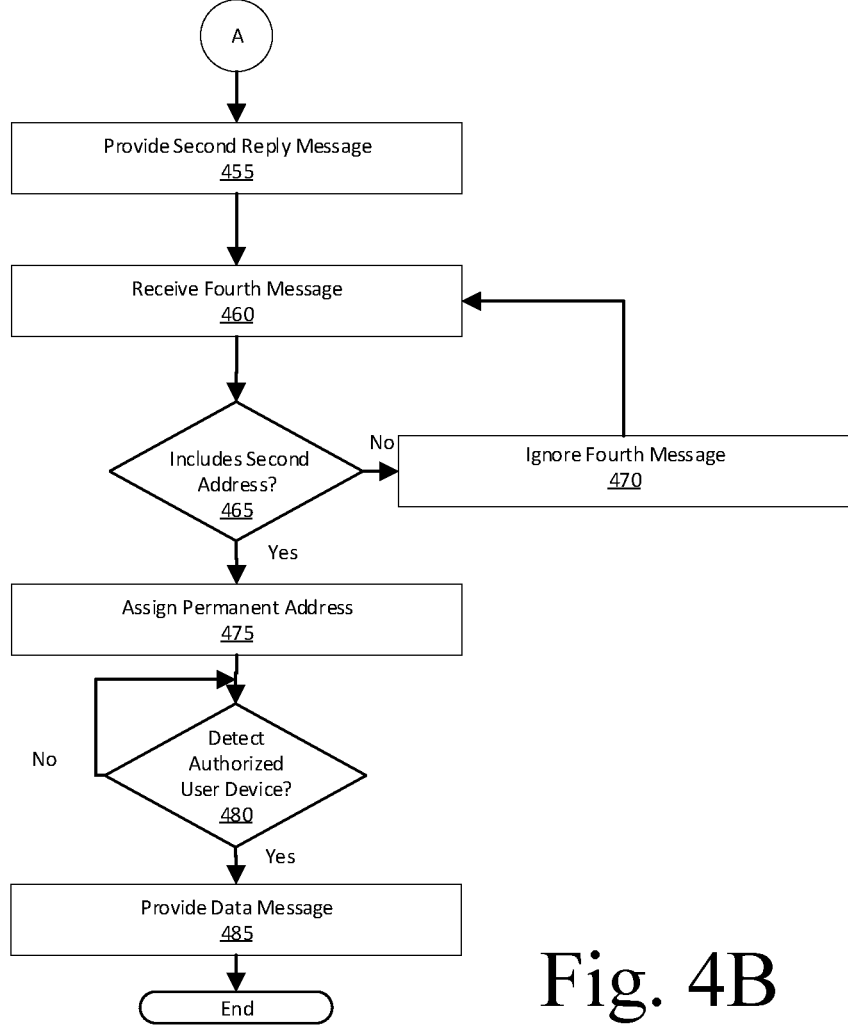
FIG. 4B is a second part of the flowchart of FIG. 4A.

Turning now to FIG. 4B, following the block 445 shown in FIG. 4A, in the block 455, the second computer 112 provides a destination message 225. The destination message 225 includes the second network address for the second computer 112, as discussed above. Upon generating the destination message 225, the second computer 112 can transmit the destination message 225 via one of the short-range broadcast protocol or the limited access communication network 107, as discussed above. The process 400 continues in a block 460.

In the block 460, the second computer 112 monitors a limited access communication network 107 to detect an assignment message 215. The assignment message 215 includes a second network address and a permanent network address, as discussed above. The second computer 112 can retrieve the second network address from the assignment message 215, as discussed above. The process 400 continues in the block 445.

In the block 465, the second computer 112 determines whether the assignment message 215 includes the second network address for the second computer 112. The block 465 is substantially the same as the block 450 of process 400. The block 465 will not be described further to avoid redundancy. If the retrieved second network address matches the assigned second network address, then the process 400 continues in a block 475. Otherwise, the process 400 continues in a block 470.

In the block 470, the second computer 112 ignores the assignment message 215. That is, the second computer 112 determines not to assign the permanent network address included in the assignment message 215 to the second computer 112. The process 400 returns to the block 460.

In the block 475, the second computer 112 assigns the permanent network address included in the assignment message 215 to the second computer 112. The second computer 112 can retrieve the permanent network address from the assignment message 215, as discussed above. The process 400 continues in a block 480.

In the block 480, the second computer 112 determines whether an authorized portable device 145 is detected within a predetermined distance of the vehicle 105, as discussed above. If an authorized portable device 145 is detected within the predetermined distance of the vehicle 105, then the process 400 continues in a block 485. Otherwise, the process 400 remains in the block 480.

In the block 485, the second computer 112 provides a relay message 230 to the first computer 110. The relay message 230 includes the permanent network address of the second computer 112 and a request to perform one or more vehicle functions, as discussed above. The second computer 112 can receive the request from the portable device 145, as discussed above. Upon generating the relay message 230, the second computer 112 can transmit the relay message 230 via the limited access communication network 107. The process 400 ends following the block 485.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
a communication network;
a first computer connected to the communication network and assigned a first network address on the communication network; and
a second computer connected to the communication network and assigned the first network address on the communication network;
wherein the first computer is programmed to:
transmit, via the communication network, a first message including the first network address and a request to generate a random number;

receive a first reply message from the second computer including the random number in response to the request;

assign a second network address for the second computer based on the random number;

transmit, via the communication network, a second message including the second network address and the random number;

transmit, via the communication network, a third message including the second network address and a second request to confirm the second network address;

receive a second reply message from the second computer including the second network address in response to the third message; and upon receiving, via a short-range broadcast protocol, the second reply message, determine a location of the second computer based on at least one of an angle-of-arrival measurement, a signal strength measurement, or a time-of-flight measurement of the second reply message.

2. A method, comprising:

at a first computer, transmitting, via a communication network, a first message including a first network address and a request to generate a random number;

receiving a first reply message from a second computer including the random number in response to the request;

assigning a second network address for the second computer based on the random number;

transmitting, via the communication network, a second message including the second network address and the random number;

transmitting, via the communication network, a third message including the second network address and a second request to confirm the second network address;

receiving a second reply message from the second computer including the second network address in response to the third message; and upon receiving, via a short-range broadcast protocol, the second reply message, determining a location of the second computer based on at least one of an angle-of-arrival measurement, a signal strength measurement, or a time-of-flight measurement of the second reply message.

3. A system, comprising:

a communication network;

a first computer connected to the communication network and assigned a first network address on the communication network; and a second computer connected to the communication network and assigned the first network address on the communication network;

wherein the first computer is programmed to:

transmit, via the communication network, a first message including the first network address and a request to generate a random number;

receive a first reply message from the second computer including the random number in response to the request;

assign a second network address for the second computer based on the random number;

transmit, via the communication network, a second message including the second network address and the random number;

transmit, via the communication network, a third message including the second network address and a second request to confirm the second network address;

receive a second reply message from the second computer including the second network address in response to the third message; and upon receiving, via the communication network, the second reply message, determine a location of the second computer based on an amount of time to receive the second reply message after sending the second request.

4. A method, comprising:

at a first computer, transmitting, via a communication network, a first message including a first network address and a request to generate a random number;

receiving a first reply message from a second computer including the random number in response to the request;

assigning a second network address for the second computer based on the random number;

transmitting, via the communication network, a second message including the second network address and the random number;

transmitting, via the communication network, a third message including the second network address and a second request to confirm the second network address;

receiving a second reply message from the second computer including the second network address in response to the third message; and upon receiving, via the communication network, the second reply message, determining a location of the second computer based on an amount of time to receive the second reply message after sending the second request.

* * * * *